United States Patent [19]

Dawson et al.

[11] Patent Number: 5,145,350
[45] Date of Patent: Sep. 8, 1992

[54] OZONE GENERATOR

[75] Inventors: James L. Dawson, Portland; Bruce R. Searle, Amity, both of Oreg.

[73] Assignee: CleanTech International, Inc., Portland, Oreg.

[21] Appl. No.: 646,162

[22] Filed: Jan. 25, 1991

[51] Int. Cl.⁵ .................... B01J 19/08; B01J 19/12
[52] U.S. Cl. ................ 422/186.15; 422/186.07
[58] Field of Search ........... 422/186, 186.04, 186.07, 422/186.15, 186.16, 186.18, 186.21

[56] References Cited

U.S. PATENT DOCUMENTS

| | | | |
|---|---|---|---|
| 1,845,670 | 5/1929 | Lebrun | 422/186.15 |
| 2,822,327 | 1/1958 | Hammersfahr et al. | 204/176 |
| 3,784,838 | 1/1974 | Lowther | 250/536 |
| 4,002,921 | 1/1977 | Lowther | 307/43 |
| 4,016,060 | 4/1977 | Lowther | 204/176 |
| 4,048,668 | 9/1977 | Von Bergen et al. | 361/235 |
| 4,128,768 | 12/1978 | Yamamoto et al. | 250/535 |
| 4,410,495 | 10/1983 | Bassler et al. | 422/186.18 |
| 4,603,031 | 7/1986 | Gelbman | 422/186.18 |
| 4,690,803 | 9/1987 | Hirth | 422/186.18 |
| 4,706,182 | 11/1987 | Masuda | 363/139 |
| 4,774,062 | 9/1988 | Heinemann | 422/186.19 |
| 4,869,881 | 9/1989 | Collins | 422/186.18 |
| 4,966,666 | 10/1990 | Waltonen | 204/164 |
| 4,981,656 | 1/1991 | Leitzke | 422/186.18 |

Primary Examiner—Brooks H. Hunt
Assistant Examiner—Daniel J. Jenkins
Attorney, Agent, or Firm—Dellett, Smith-Hill and Bedell

[57] ABSTRACT

A conversion cell for an ozone generator comprises a first electrode that is hollow and has a right cylindrical internal surface, a second electrode that has a right cylindrical external surface of smaller radius than the internal surface of the first electrode, and an insulator sleeve having coaxial right cylindrical internal and external surfaces. The insulator sleeve is disposed coaxially within the first electrode and the second electrode is disposed coaxially within the insulator sleeve, whereby first and second gas spaces are defined between the insulator sleeve and the first and second electrodes respectively. The first and second gas spaced are sealed at opposite respective ends of the conversion cell and are in open communication with each other.

11 Claims, 3 Drawing Sheets

OZONE GENERATOR

BACKGROUND OF THE INVENTION

This invention relates to an ozone generator.

A conversion cell for generation of ozone generally comprises two electrodes having an insulator therebetween. The insulator does not occupy the entire space between the confronting surfaces of the electrodes, but a gas space is left between the insulator and one of the electrodes. The gas space has an inlet port and an exit port. The inlet port is connected to a source of a feed gas under pressure and the outlet port is connected to a volume at lower pressure than the supply pressure of the feed gas. Accordingly, the feed gas, which contains oxygen, flows through the gas space. The electrodes are normally of approximately equal surface area, and an alternating potential of 5 kv or more and a frequency of 0.05-3 kHz, is established between the electrodes, for example by connecting the electrodes to opposite ends of the secondary winding of a transformer, the primary winding of which is connected to an alternating current source at a considerably lower voltage. A corona discharge is established in the gas space. Some of the oxygen molecules present in the gas space disassociate into atoms, and some of the oxygen atoms combine with oxygen molecules to create ozone molecules.

It is desirable that the ozone remain at a relatively low temperature, because at temperatures above about 48° C. an ozone molecule readily disassociates into an oxygen atom and an oxygen molecule, and there is a high probability that oxygen atoms will recombine to form oxygen molecules. A large proportion (80% to 90%) of the electrical energy supplied to the conversion cell of a conventional ozone generator is not utilized directly in the conversion of oxygen to ozone, and this excess energy is dissipated as heat. One mechanism for generation of heat is the rapid reversals of electrical stress applied to the dielectric and the gas present in the gas space. Most conventional ozone generators require liquid cooling or a refrigeration system to remove the heat generated by the excess energy supplied to the conversion cell.

Using oxygen as the feed gas, the gas supplied at the outlet of an ozone generator that is currently available may contain up to about 2% by weight ozone. Because of the input energy required and the resulting generation of heat, few conventional ozone generators are able to generate continuously a gas mixture containing more than 2% by weight ozone.

U.S. Pat. No. 4,869,881 (Collins) discloses an ozone generator in which a silicon controlled rectifier (SCR) is connected in parallel with the primary winding of a transformer the secondary winding of which is connected to the electrodes of the conversion cell. The SCR is repeatedly fired in order to chop the DC voltage provided by a power supply into pulsed DC voltage. The frequency at which the SCR is fired is controlled by a potentiometer.

U.S. Pat. No. 4,128,768 (Yamamoto et al) discloses an ozone generator in which silicon controlled rectifiers are used to convert a direct current supplied by a power supply to alternating form for application to the primary winding of the transformer.

In accordance with the disclosure of Yamamoto et al, the voltage applied to the electrodes of the conversion cell varies cyclically, and as the potential difference between the electrodes increases, the potential difference across the gas space increases to a threshold value, at which discharge takes place, and immediately falls to zero, and this cycle repeats several times within each cycle of the alternating voltage between the electrodes.

U.S. Pat. No. 1,845,670 (Lebrun) discloses a transformer-driven ozone generator.

U.S. Pat. No. 4,410,495 (Bassler et al) discloses an ozone generator having a cylindrical conversion cell in which the outer electrode is composed of multiple sleeves spaced apart along the cell. The sleeves are connected through respective switches to an alternating current source.

U.S. Pat. No. 4,603,031 (Gelbman) discloses a cylindrical conversion cell in which the gas space is defined between the insulator and the exterior surface of the inner electrode, and the inner electrode is apertured. Feedstock gas is supplied to the gas space by way of the interior of the inner electrode and the apertures in the inner electrode.

U.S. Pat. No. 4,690,803 (Hirth) discloses an ozone conversion cell in which the gas space is defined between the exterior surface of the insulator and the interior surface of the outer electrode. The insulator is carried by the inner electrode and is provided with a protective layer of passivating glass.

U.S. Pat. No. 4,966,666 (Waltonen) discloses a cylindrical conversion cell in which the insulator is in the form of a rod having a helical groove at its exterior surface, and the groove constitutes the gas space to which feedstock gas is supplied. It will be recognized by those skilled in the art that a gas space in the form of a helical groove provides a long dwell time for the feedstock gas in the conversion cell.

SUMMARY OF THE INVENTION

In accordance with a first aspect of the invention, an ozone generator comprises a d.c. power supply having first and second d.c. terminals, and a transformer. The transformer's primary winding has a first end connected to the first d.c. terminal and also has a second end. A controllable switch defines a current path between first and second electrodes, one of which is an anode and the other of which is a cathode. The first electrode of the switch is connected to the second d.c. terminal of the power supply and the second electrode of the switch is connected to the second end of the primary winding. The ozone generator also comprises a conversion cell having first and second electrodes connected to the opposite ends respectively of the transformer's secondary winding.

In accordance with a second aspect of the invention, a conversion cell for an ozone generator comprises a first electrode that is hollow and has a right cylindrical internal surface, a second electrode that has a right cylindrical external surface of smaller radius than the internal surface of the first electrode, and an insulator sleeve having coaxial right cylindrical internal and external surfaces. The insulator sleeve is disposed within the first electrode and the second electrode is disposed within the insulator sleeve, and a gas space is defined between the insulator sleeve and one of the electrodes, which is formed in its right cylindrical surface with two annular grooves at its two opposite ends respectively. O-rings are fitted in the grooves respectively for sealing the gas space at opposite respective ends of the conversion cell.

In accordance with a third aspect of the invention, a conversion cell for an ozone generator comprises a first electrode that is hollow and has a right cylindrical internal surface, a second electrode that has a right cylindrical external surface of smaller radius than the internal surface of the first electrode, and an insulator sleeve having coaxial right cylindrical internal and external surfaces. The insulator sleeve is disposed coaxially within the first electrode and the second electrode is disposed coaxially within the insulator sleeve, whereby first and second gas spaces are defined between the insulator sleeve and the first and second electrodes respectively. The first and second gas spaces are sealed at opposite respective ends of the conversion cell and are in open communication with each other.

BRIEF DESCRIPTION OF THE DRAWINGS

For a better understanding of the invention, and to show how the same may be carried into effect, reference will now be made, by way of example, to the accompanying drawings in which.

In the different figures, like reference numerals designate corresponding components, and primed reference numerals designate components that have similar functions to components that are designated by corresponding unprimed reference numerals.

DETAILED DESCRIPTION

Figure 1:
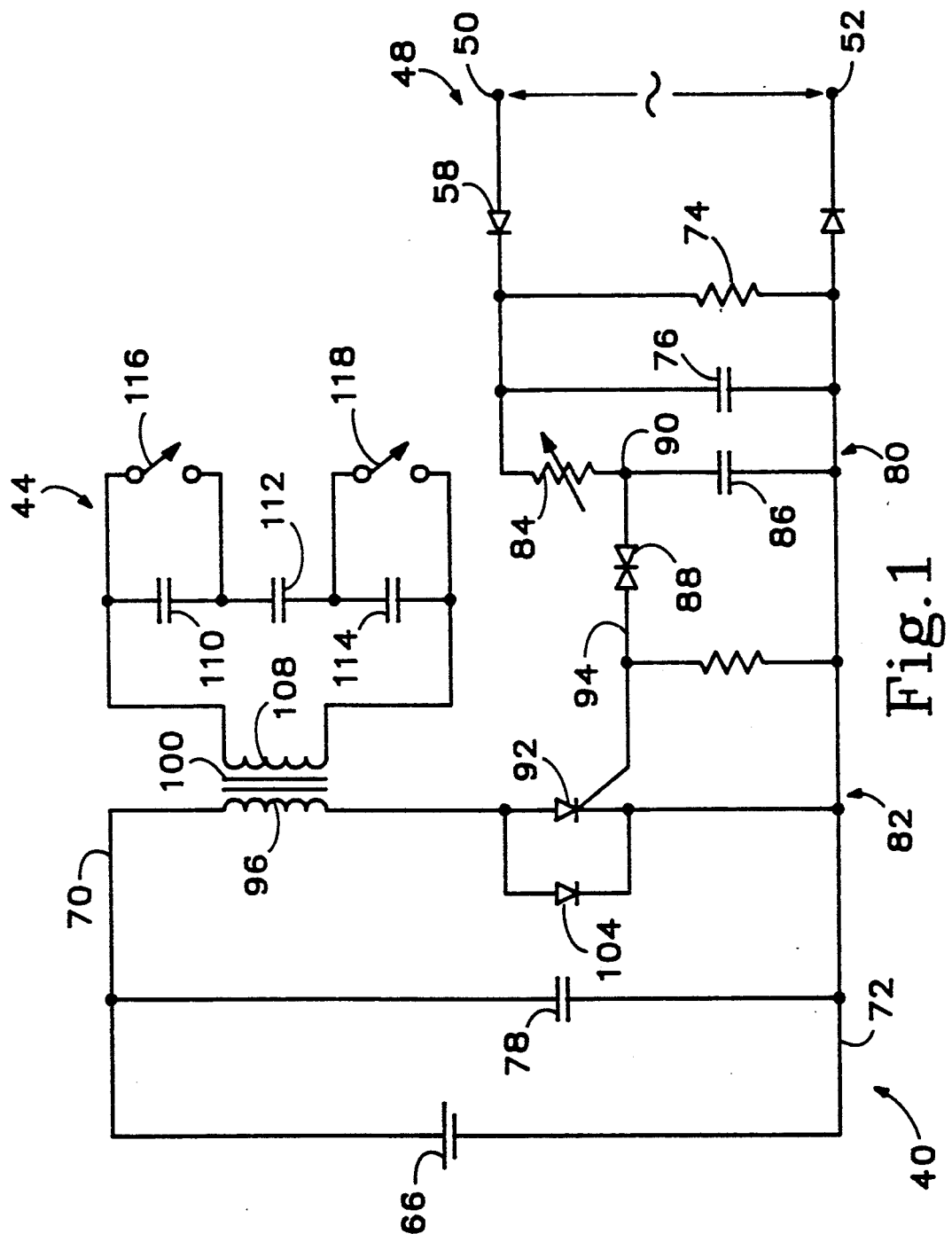
FIG. 1 is a simplified schematic diagram of an ozone generator embodying the present invention.

The ozone generator shown in FIG. 1 comprises a drive circuit 40 and a conversion cell 44.

Figure 2:
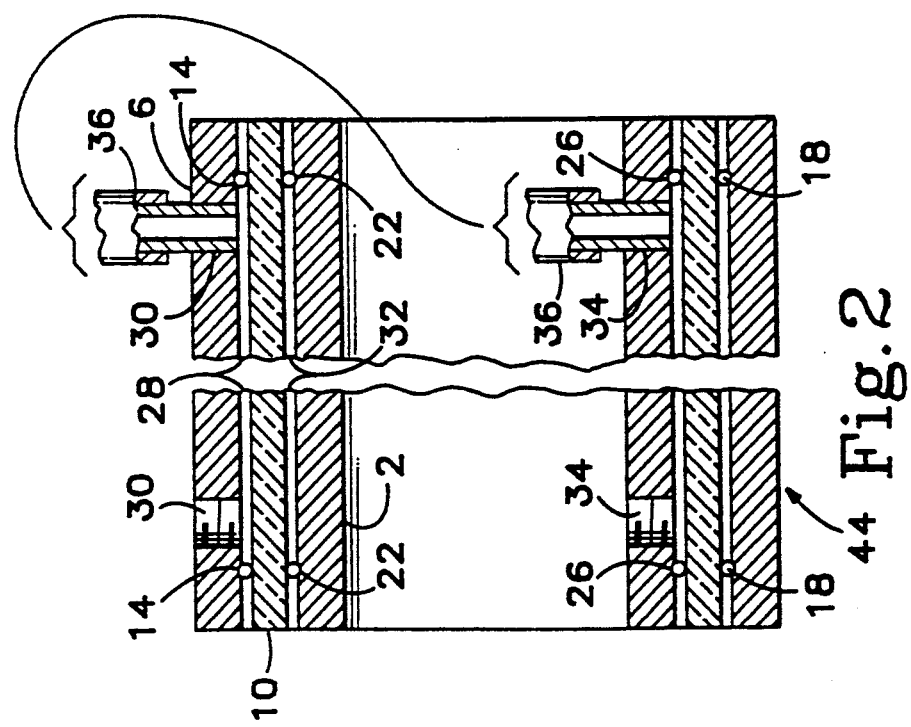
FIG. 2 is a longitudinal sectional view of the preferred form of the conversion cell of the ozone generator.

The conversion cell is shown in detail in FIG. 2 and comprises an inner electrode 2, which is tubular in form, an outer tubular electrode 6, and a sleeve 10 of electrically insulating material. Typically, the length of the outer electrode 6 is between about 22 cm and about 45 cm, depending on the desired output of ozone.

The external diameter of sleeve 10 is 8.89 cm +/−0.025 mm and its internal diameter is 8.51 cm +/−0.025 mm. The internal and external surfaces of sleeve 10 are concoaxial to within 0.025 mm. The external diameter of electrode 2 is 8.453 cm +/−0.025 mm and the internal diameter of electrode 6 is 8.946 cm +/−0.025 mm. An annular groove 14 is machined in the interior surface of electrode 6 at each end thereof, and an O-ring 18 is fitted in each groove. Similarly, an annular groove 22 is machined in the exterior surface of electrode 2 at each end thereof, and O-rings 26 are fitted in the grooves respectively. Electrode 2 is fitted inside sleeve 10, and sleeve 10 is fitted inside electrode 6, and O-rings 18 and 26 support sleeve 10 relative to electrodes 2 and 6 so that the internal surface of electrode 6 and the external surface of electrode 2 are substantially coaxial with the internal and external surfaces of sleeve 10. An annular gas space 28 of uniform radial extent is defined between electrode 6 and sleeve 10 and is bounded by the O-rings 18 and an annular gas space 32 of uniform radial extent is defined between electrode 2 and sleeve 10 and is bounded by the O-rings 26. The O-rings 18 and 26 permit relative movement of the electrodes 2 and 6 and the sleeve 10, to accommodate differential thermal expansion while maintaining the electrodes 2 and 6 and the sleeve 10 in coaxial relationship and ensuring that the electrodes and sleeve do not inadvertently become disassembled.

The outer electrode 6 is formed at its two opposite ends with respective internally threaded holes 30, which communicate with the gas space 28, and the inner electrode 2 is formed at its two opposite ends with respective internally threaded holes 34, which communicate with the gas space 32. The holes 30 and 34 at one end of the conversion cell receive respective externally threaded fittings which are connected by a flexible tube 36, providing a flow path between the gas spaces 28 and 32. The holes 30 and 34 at the opposite end of the conversion cell receive respective fittings (not shown), for connection to a source of feed gas and to a utilization device respectively.

The preferred material for the electrodes 2 and 6 is aluminum, because it is inexpensive and is easily formed to the tolerances that are required. The preferred material for sleeve 10 is pyrex glass, because it is a very good insulator and therefore application of alternating electrical stress to the sleeve does not generate a large displacement current, which can only be dissipated as heat.

The drive circuit 40 is shown in FIG. 1 and comprises power supplies 48 and 66, an oscillator 80 and an output section 82.

The power supply 66 is a d.c. power supply having a positive output terminal connected to a positive supply rail 70 and a negative output terminal connected to a negative supply rail 72. A capacitor 78 is connected between rails 70 and 72.

The power supply 48 has power supply terminals 50, 52 connected to the hot and neutral wires respectively of a source of alternating current at 110 volts RMS and 60 Hz, such as a public utility supply. Power supply terminal 50 is connected to the anode of a diode 58.

A resistor 74 and a capacitor 76 are connected in parallel between the cathode of diode 58 and the negative supply 48 rail 72. Thus, the power supply provides a fairly smooth d.c. voltage at the cathode of diode 58.

The cathode of diode 58 is connected to provide operating current to oscillator 80, which is a relaxation oscillator comprising a variable resistor 84 and a capacitor 86 connected in series and a bidirectional breakdown diode 88 having one terminal connected to the point 90 between resistor 84 and capacitor 86. The opposite terminal of breakdown diode 88 is connected to the output terminal 94 of the oscillator.

The output terminal 94 of oscillator 80 is connected to the gate of an SCR 92, which is connected in series with the primary winding 96 of a transformer 100 between the positive and negative supply rails 70 and 72. A diode 104 is connected anti-parallel to SCR 92. The secondary winding 108 of transformer 100 is connected at its opposite ends to the conversion cell 44, which is depicted in FIG. 1 by its equivalent circuit comprising three capacitors 110, 112 and 114 connected in series and two switches 116 and 118 connected in parallel with capacitors 110 and 114 respectively. Capacitor 110 and switch 116 represent the gas space 28, capacitor 112 represents the insulator sleeve 10, and capacitor 114 and switch 118 represent the gas space 32. When the voltage between the electrodes 2 and 6 is sufficiently low that no discharge takes place in the gas spaces, switches 116 and 118 are non-conductive, whereas when a discharge occurs in one of the gas spaces, the corresponding switch 116 or 118 is conductive.

In normal operation of the ozone generator, the d.c. power supply 66 establishes rail 70 at a positive potential of about 140 volts relative to rail 72 and supplies sufficient current to sustain conduction of SCR 92.

In steady-state operation of the ozone generator, the voltage at the point 90 between variable resistor 84 and capacitor 86 varies in accordance with a sawtooth waveform, the period of which depends on the capacitance of the capacitor 86, the resistance of the resistor 84 and the breakover voltage of the breakdown diode 88. Immediately before the potential at point 90 reaches the breakover voltage of the breakdown diode, the potential at the gate of the SCR 92 is held to the potential of the negative supply rail 72 by the resistor 124 that is connected between the output terminal of the oscillator and rail 72.

Each time the voltage at the point 90 reaches the breakover voltage of breakdown diode 88, breakdown diode 88 becomes conductive and current flows to the output terminal 94 of the oscillator. Capacitor 86 is rapidly discharged into the gate of SCR 92, which becomes conductive. The voltage effective across the primary winding 96 of transformer 100 causes a current to flow through the primary winding, and accordingly conduction of the SCR is sustained. The current increases in accordance with a sinusoidal waveform. A current is also induced in the secondary winding of transformer 100, resulting in a potential being developed between the electrodes 2 and 6. When the potential is first developed across the conversion cell, the gas in the gas spaces is non-conductive and accordingly switches 116 and 118 of the cell's equivalent circuit are non-conductive. The voltage between electrodes 2 and 6 increases until there is a discharge in the gas spaces, and the voltage between the electrodes 2 and 6 then abruptly drops. When the voltage between the electrodes drops, the current in the secondary winding 108 of transformer 100 reverses and this induces a current in the primary winding that is opposed to the current supplied by rails 70 and 72. The anode of SCR 92 is driven negative relative to the negative rail 72, and accordingly the SCR becomes non-conductive. The energy that is provided to the conversion cell 44 by the driver circuit 40 but is not used to generate ozone is excess energy and would be dissipated as heat in the conversion cell 44 if not returned to the driver circuit. The excess energy is returned to the driver circuit 40 through diode 104, the primary winding 96 of transformer 100 and rail 70 and is stored in capacitor 78 until the sequence of operations is repeated when the voltage at the point 90 again reaches the breakdown voltage of breakdown diode 88.

Since the SCR 92 is turned off as soon as a discharge takes place in the conversion cell, and the excess energy is returned to the drive circuit 40, there is little energy dissipated as heat in the conversion cell, and therefore most of the power consumed by the conversion cell is used to generate ozone and is not dissipated as heat. Therefore, the illustrated ozone generator is more efficient than conventional ozone generators. The maximum current that can flow in the conversion cell 44 depends on the quantity of gas in the conversion cell, and this in turn depends on the mass rate of flow of feed gas. Since little heat is generated by operation of the conversion cell even at low flow rates the cell remains below about 38° C. at an ambient temperature of 18.5° C. without need for forced cooling, e.g. by means of a fan. If the ozone generator is to be used under circumstances where the ambient temperature is higher than about 26° C., a fan (not shown) may be used to supply cooling air in order to keep the temperature of the conversion cell well below 48° C.

The output of the conversion cell (mass of ozone per unit time) depends on the pressure with which feed gas is supplied to the conversion cell, the mass rate of flow of feed gas into the conversion cell, and the frequency of the oscillator. As the oscillator frequency increases, the number of discharges per unit time also increases.

It has been found that in operation of the preferred embodiment of the invention, employing a conversion cell about 23 cm long and supplying oxygen as the feed gas, the concentration of ozone in the gas leaving the conversion cell is well in excess of 2% by weight and can reach as high as 10% by weight. The rate of supply of feed gas can be reduced to an arbitrarily low level without adverse effects. Little heat is generated in the insulator sleeve due to displacement current.

Oscillator 80 is able to operate over a wide range of frequencies, from about 50 Hz to about 2 kHz. In use, resistor 84 is adjusted so that oscillator 80 operates at a frequency close to the resonant frequency of the tank circuit, which depends on the dimensions of the conversion cell and is typically about 1.1 kHz.

The resonant period of the tank circuit composed of the secondary winding of transformer 100 and the conversion cell 44 is composed of a charging interval during which the potential between the electrodes 2 and 6 increases, an interval during which the discharge takes place, and a recovery interval. The duration of the charging interval depends on the voltage at which the discharge takes place and on the rate of change of the voltage between the electrodes 2 and 6 during the charging interval, which in turn depends on the frequency at which the current in the tank circuit would oscillate if no discharge took place.

Figure 3:
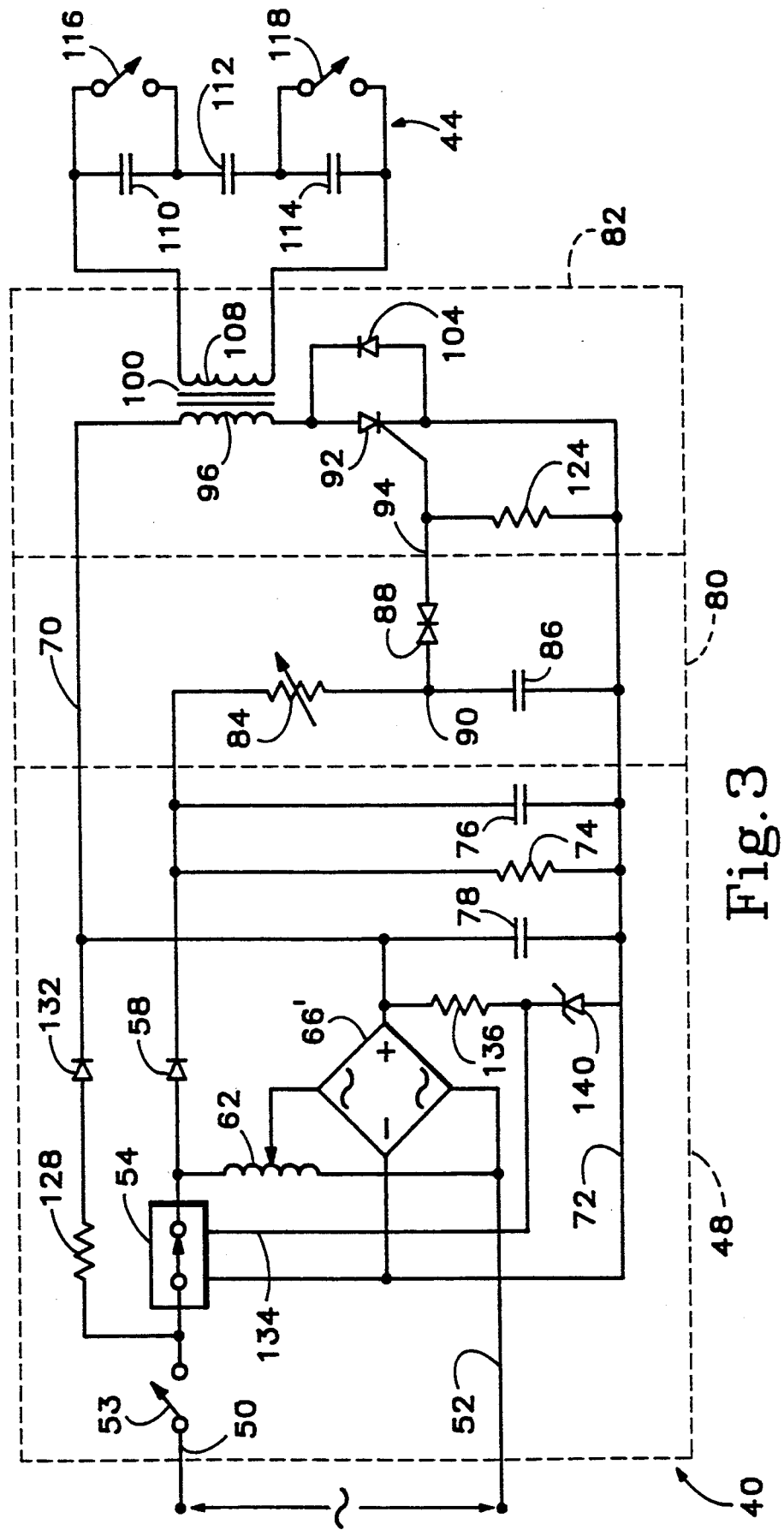
FIG. 3 is a more detailed diagram of the ozone generator shown in FIG. 1.

FIG. 3 illustrates a modification of FIG. 1 in which an on-off switch 53 and the switched path of a solid state relay 54 are connected between the power supply terminal 50 and the anode of diode 58. A variac 62 has its fixed terminals connected to the anode of diode 58 and the power supply terminal 52 respectively. A full-wave rectifier 66' is connected between the movable terminal of the variac 62 and power supply terminal 52. The positive and negative output terminals of rectifier 66 and connected to rails 70 and 72 respectively.

On initial start-up of the drive circuit shown in FIG. 3, the switched path of relay 54 is non-conductive, and accordingly relay 54 is unable to supply current to rectifier 66'. Terminal 50 is connected through switch 53, a current limiting resistor 128 and a diode 132 to rail 70, which is connected to the control terminal 134 of relay 54 through a resistor 136. Capacitor 78 charges until the voltage at terminal 134 is sufficient to cause the switched path of relay 54 to become conductive, and variac 52 and rectifier 66' will then latch relay 54 in its conductive state and drive rail 70. A zener diode 140 is connected between terminal 134 and the negative rail 72 to limit the voltage that can be applied to the control terminal of relay 54 and thus protect relay 54 from transients.

In the event of a fault such that the anode of SCR 92 is not driven negative relative to rail 72 and therefore SCR 92 is not reverse biased to the non-conductive state, capacitor 78 will discharge through primary winding 96 and SCR 92 until the voltage at the terminal 134 falls below the control voltage of relay 54. The switched path of relay 54 then becomes non-conductive and no longer supplies current to oscillator 80 or output section 82. Resistor 128 is sized so that at the normal input voltage it cannot supply sufficient current to maintain SCR 92 in the conductive state. Accordingly, SCR 92 is deprived of sustaining current and the SCR becomes non-conductive and remains non-conductive even though diode 132 supplies current to rail 70.

Transformer 100 is a low leakage transformer capable of generating a sufficient potential difference between electrodes 2 and 6 to cause a discharge to take place in the conversion cell and must be able to provide sufficient current at that potential difference to support the discharge. The current depends on the size of the conversion cell, and in the case of a cell as shown in FIG. 2 that is about 45 cm long a current of 0.4 A is suitable.

Figure 4:
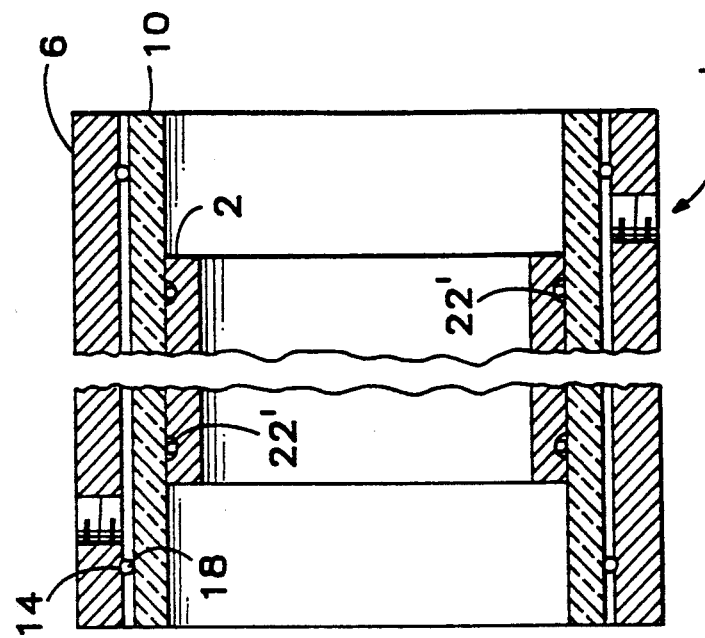
FIG. 4 is a longitudinal sectional view of an alternative construction of the conversion cell.

FIG. 4 illustrates a cell construction that is similar to the one shown in FIG. 2 except that only one gas space is defined, between the external surface of insulator sleeve 10 and the internal surface of electrode 6. O-rings 22' support electrode 2 relative to sleeve 10, and in the event that a fan is used to provide a flow of cooling air over the external surface of electrode 6 and through the interior of electrode 2, the O-rings 22' serve to prevent air from passing between electrode 2 and the sleeve 10 and leading to release of ozone into the ambient air.

The cell construction shown in FIG. 2 is preferred over that shown in FIG. 4. Two conversion cells, as shown in FIGS. 2 and 4 respectively and each 23 cm long, were compared, and under the same conditions of oscillation frequency, feed gas pressure and mass rate of flow of feed gas, the cell construction shown in FIG. 2 was found to provide a significantly greater output of ozone and to consume significantly less energy per unit mass of ozone generated.

It will be appreciated that the invention have been described, and that variations may be made therein without departing from the scope of the invention as defined in the appended claims and equivalents thereof. In particular, the invention is not restricted to the power supply and oscillator that are shown in FIG. 3, and it may, for example, be desirable to employ a full-wave rectifier to supply operating current for the oscillator. Further, the invention is not restricted to the use of a bidirectional breakdown diode in the relaxation oscillator, and other devices, such as a unijunction transistor, could be used instead.

We claim:

1. An ozone generator comprising:
a power supply having first and second line terminals for connection to a source of alternating current and also having first, second and third d.c. output terminals,
a transformer comprising a primary winding having a first end connected to the first d.c. output terminal and also having a second end, and the transformer also comprising a second winding having two opposite ends,
a controllable switch defining a current path between first and second electrodes, one of which is an anode and the other of which is a cathode, the first electrode of the switch being connected to the second d.c. output terminal and the second electrode of the switch being connected to the second end of the primary winding, the switch having a control electrode for controlling the state of the current path,
a relaxation oscillator connected to the control electrode of the switch for periodically supplying charge to the control electrode for placing the current path in a conductive state,
a conversion cell having first and second electrodes connected to the opposite ends respectively of the secondary winding of the transformer,
a diode whose cathode is connected to the third d.c. output terminal, and
a relay having a switched path connected between the first line terminal and the anode of the diode.

2. An ozone generator according to claim 1, comprising a full-wave rectifier connected between the anode of the diode and the second line terminal and having positive and negative terminals connected to the first and second d.c. terminals respectively, whereby the rectifier provides current to the transformer's primary winding only in the event that the switched path of the relay is conductive.

3. An ozone generator according to claim 2, wherein the relay has a control terminal connected to said first d.c. terminal, and the power supply further comprises a rectifier connected between the first line terminal and said first d.c. terminal for supplying direct current to the control terminal of the relay when the switched path is non-conductive.

4. An ozone generator according to claim 3, wherein the switch is a silicon controlled device and the power supply comprises a current limiting resistor connected in series with said rectifier for limiting current supplied to the transformer primary winding through said rectifier to a level less than the sustaining current for the silicon controlled device.

5. An ozone generator comprising:
a power supply having first and second d.c. output terminals,
a transformer comprising a primary winding having a first end connected to the first d.c. output terminal and also having a second end, and the transformer also comprising a secondary winding having two opposite ends,
a controllable switch defining a current path between first and second electrodes, one of which is an anode and the other of which is a cathode, the first electrode of the switch being connected to the second d.c. output terminal and the second electrode of the switch being connected to the second end of the primary winding, and
a conversion cell comprising a first annular electrode connected to one of the two opposite ends of the secondary winding of the transformer and having a right cylindrical internal surface, a second annular electrode connected to the other end of the secondary winding and having a right cylindrical external surface of smaller radius than the internal surface of the first annular electrode and substantially coaxial therewith, and an insulator sleeve having coaxial right cylindrical internal and external surfaces, the radius of the internal surface of the insulator sleeve being slightly greater than the radius of the external surface of the second annular electrode and the radius of the external surface of the insulator sleeve being slightly less than the radius of the internal surface of the first annular electrode, the insulator sleeve being disposed within the first annular electrode and the second annular electrode being disposed within the insulator sleeve, whereby a first gas space is defined between the external surface of the insulator sleeve and the internal surface of the first annular electrode and a second gas space is defined between the internal surface of the insulator sleeve and the external surface of the second annular electrode, one of the first and second gas spaces receiving feed gas that contains oxygen and the firs gas space being in communication with the second gas space, and wherein the first annular electrode is formed in its internal surface with an annular groove at each end, the second annular electrode is formed in its external surface with an annular groove at each end, and the conversion cell further comprises O-rings fitted in the grooves respectively for sealing the gas spaces at opposite respective ends of the conversion cell.

6. A conversion cell for an ozone generator, said conversion cell comprising a first electrode that is hollow and has a right cylindrical internal surface, a second electrode that has a right cylindrical external surface of smaller radius than the internal surface of the first electrode, and an insulator sleeve having coaxial right cylindrical internal and external surfaces, the radius of the internal surface of the insulator sleeve being slightly greater than the radius of the external surface of the second electrode and the radius of the external surface of the insulator sleeve being slightly less than the radius of the internal surface of the first electrode, the insulator sleeve being disposed within the first electrode and the second electrode being disposed within the insulator sleeve a first gas space being defined between one of the right cylindrical surfaces of the insulator sleeve and one of the first and second electrodes and a second gas space being defined between the other of the right cylindrical surfaces of the insulator sleeve and the other of the first and second electrodes, said one electrode being formed in its right cylindrical surface with an annular groove at each end, and the conversion cell further comprising O-rings fitted in the grooves respectively and engaging said one right cylindrical surface of the insulator sleeve for sealing the first gas space at opposite respective ends of the conversion cell.

7. A conversion cell according to claim 6, further comprising means connecting the first gas space to the second gas space.

8. A conversion cell for an ozone generator, said conversion cell comprising a first electrode that is hollow and has a right cylindrical internal surface, a second electrode that has a right cylindrical external surface of smaller radius than the internal surface of the first electrode, and an insulator sleeve having coaxial right cylindrical internal and external surfaces, the insulator sleeve being disposed coaxially within the first electrode and the second electrode being disposed coaxially within the insulator sleeve, whereby first and second gas spaces are defined between the insulator sleeve and the first and second electrodes respectively, and means for sealing the first and second gas spaces at opposite respective ends of the conversion cell, the first and second gas spaces being in open communication.

9. A conversion cell according to claim 8, wherein said first electrode is formed in its right cylindrical surface with an annular groove at each end, the second electrode is formed in its external surface with an annular groove at each end, and the sealing means comprise O-rings fitted in the grooves respectively.

10. A conversion cell according to claim 8, wherein the first electrode is formed with first and second holes at opposite respective ends of the conversion cell for providing access to the first gas space, the second electrode is formed with first and second holes at opposite respective ends of the conversion cell for providing access to the second gas space, and the conversion cell comprises means connecting the first hole in the first electrode with the first hole in the second electrode.

11. An ozone generator comprising:
a power supply having first and second d.c. terminals,
a transformer comprising a primary winding having first and second ends and a secondary winding having two opposite ends,
ohmically conductive means connecting the first end of the primary winding to the first d.c. terminal,
a controllable unidirectional semiconductor switch defining a current path between first and second electrodes, one of which is an anode and the other of which is a cathode, the first electrode of the switch being connected to the second d.c. terminal and the second electrode of the switch being connected to the second end of the primary winding,
a diode connected antiparallel to the semiconductor switch,
a conversion cell comprising a first annular electrode having a right cylindrical internal surface, a second annular electrode having a right cylindrical external surface of smaller radius than the internal surface of the first electrode, and an insulator sleeve having coaxial right cylindrical internal and external surfaces, the radius of the internal surface of the insulator sleeve being slightly greater than the radius of the external surface of the second electrode and the radius of the external surface of the insulator sleeve being slightly less than the radius of the internal surface of the first electrode, the insulator sleeve being disposed within the first electrode and the second electrode being disposed within the insulator sleeve, whereby a first gas space is defined between the external surface of the insulator sleeve and the internal surface of the first electrode and a second gas space is defined between the internal surface of the insulator sleeve and the external surface of the second electrode, the first and second electrodes being connected to the opposite ends respectively of the secondary winding of the transformer, and the conversion cell further comprising means for introducing feed gas that contains oxygen into one of the first and second gas spaces at one end of the conversion cell, means for exhausting gas from the other of the first and second gas spaces at said one end of the conversion cell, and means connecting the first and second gas spaces at the other end of the conversion cell, whereby gas flows sequentially through the said one gas space and said other gas space.

* * * * *

UNITED STATES PATENT AND TRADEMARK OFFICE
CERTIFICATE OF CORRECTION

PATENT NO. : 5,145,350
DATED : September 8, 1992
INVENTOR(S) : James L. Dawson; Bruce R. Searle It is certified that error appears in the above-identified patent and that said Letters Patent is hereby corrected as shown below:

On the title page, in the ABSTRACT, line 12, "spaced" should read --spaces--.

Column 6, line 49, "66 and connected" should read --66 are connected--.

Column 7, line 39, after "invention" insert --is not restricted to the particular embodiments that--.

Column 7, line 60, "second winding" should read --secondary winding--.

Column 9, line 9, "firs gas" should read --first gas--.

Signed and Sealed this

Twelfth Day of October, 1993

Attest:

BRUCE LEHMAN

*Attesting Officer*   *Commissioner of Patents and Trademarks*